United States Patent
August

[11] 3,744,249
[45] July 10, 1973

[54] COMBUSTION ENGINE DEVICE

[76] Inventor: Paul August, Arabellastrasse 5, D-8000 Munich 81, Germany

[22] Filed: Sept. 16, 1970

[21] Appl. No.: 72,670

[30] Foreign Application Priority Data
Sept. 16, 1969 Germany.................. P 19 46 862.3
Aug. 14, 1970 Germany.................. P 20 40 584.9

[52] U.S. Cl.................... 60/286, 23/288 F, 60/288, 60/300, 60/318
[51] Int. Cl............................................ F01h 3/14
[58] Field of Search................ 60/29 A, 30 R, 30 L, 60/288, 284, 285, 287, 318, 286, 300, 292; 23/2 E, 288 F

[56] References Cited
UNITED STATES PATENTS

| | | | |
|---|---|---|---|
| 2,071,119 | 2/1937 | Harger | 60/288 |
| 3,090,677 | 5/1963 | Scheitlin | 60/288 |
| 3,150,922 | 9/1964 | Ashley | 60/284 |
| 3,209,531 | 10/1965 | Morris | 60/288 |
| 3,273,971 | 9/1966 | Baddorf | 60/284 |
| 2,947,600 | 8/1960 | Clayton | 60/30 R |
| 3,094,394 | 6/1963 | Innes | 60/30 R |
| 3,142,150 | 7/1964 | Pearlman | 60/30 R |
| 3,170,758 | 2/1965 | Honerkamp | 60/30 R |
| 3,239,317 | 3/1966 | Rhodes | 60/29 A |
| 3,276,202 | 10/1966 | Gary | 60/30 R |
| 3,282,046 | 11/1966 | Walker | 60/29 F |
| 3,370,914 | 2/1968 | Gross | 23/2 E |
| 3,494,445 | 2/1970 | Ott | 60/30 R |
| 3,503,714 | 3/1970 | Lang | 23/288 F |

FOREIGN PATENTS OR APPLICATIONS

| | | | |
|---|---|---|---|
| 411,377 | 6/1934 | Great Britain | 60/288 |
| 1,188,373 | 3/1965 | Germany | 60/29 A |
| 1,216,496 | 11/1959 | France | 60/29 A |

Primary Examiner—Douglas Hart
Attorney—Sherman Levy

[57] ABSTRACT

A combustion engine apparatus for use in the exhaust system of an engine for reducing the non-burned and partially burned constituents in the exhaust gas, a coaxial annular reaction chamber having longitudinally arranged heater chamber and an after-combustion chamber having catalytic material therein, a spring-loaded throttle valve eccentrically mounted within the exhaust system intermediate the ends of the coaxial chamber, being maintained essentially closed until excessively high rates of combustion and resulting dynamic pressure open the valve.

8 Claims, 3 Drawing Figures

3,744,249

PAUL AUGUST, INVENTOR

COMBUSTION ENGINE DEVICE

The present invention relates to a mixture compressing externally ignited combustion engines with devices in the exhaust gas system for reducing the partially or non burnt constituent parts in the exhaust gas.

Devices for reducing the partially or non burnt constituent parts in the exhaust gas in combustion engines, in particular motor car engines may be provided in the suction system or in the exhaust system.

It is known to use mixture improving devices in the suction system and after-burners in the exhaust system. There are various drawbacks attached to these devices. With the devices disposed in the suction system complicated control systems for the additional combustion air are necessary and furthermore a comparatively large space is required at places where the availability of space is very limited. If one only uses devices which are effective in the exhaust gas system, then after burning at low temperature using catalysts is delayed much too long when the engine is started from cold.

To comply with the California test and European tests, cold starting devices are necessary to reduce the comparatively high CO and CH portions which occur in the exhaust since it is required that in town traffic conditions the exhasut gases should be decontaminated.

If after-burners are used which in cold start conditions also produce substantial decontamination of the exhaust gases then a drawback occurs in that either it is necessary to supply additional air and use a comparatively large after-burner, or a small after-burner can be used but extra supplies of additional air necessary for total combustion have to be added in the suction system which has the disadvantage of loss in power at full load.

An object of the invention is to obviate these drawbacks and reduce the partial and non burnt constituent in the exhaust gas to a level which satisfies the requirements of the California tests and European tests, but at the same time the device does not require a large space in which to be mounted and does not cause power loss at full load.

This solution of the problem according to the invention consists in that the entry of the exhaust gases in the devices into an after-burner is dependent of the position of a guide member influenced by the engine power.

According to the construction a basically new method is applied. The device disposed in the exhaust gas system is arranged and constructed so that the exhaust gases flow therethrough, and the device is positioned in a desired region which is dependent on the engine power and/or engine speed. As a rule this device will be effectively only in the lower or middle load range of the engine in the upper load range the exhaust gases will leave the engine in a way which does not cause losses of power of the exhaust gases will reach the open air through an ordinary exhaust and silencer system.

In a suitable construction an after-burner is provided in shunt relation to the exhaust pipe. The guide member either leads the exhaust gases through the afterburner or the afterburner is by-passed or short circuited by the exhaust gases. A simplified construction is achieved by accommodating the afterburner in a cover surrounding the exhaust pipe.

With this construction one can use practically a normal silencer for the reduction of the non burnt constituents in the exhaust gas. An ante-chamber can be connected in series with the after-burner in the direction of gas flow, and this ante-chamber is provided with inlet openings for the exhaust gases.

There are several possible combinations using this ante-chamber, some of which will be described below.

In one construction in which inlet openings lead into an ante-chamber, it is important that the guide member is a throttle valve which, when viewed in the direction of flow, lies behind the inlet openings. If such a throttle valve is used then it is essential for the eccentrically pivoted throttle valve to be moved by the dynamic pressure of the exhaust gas against the action of a closing spring and for the spring to hold the valve closed or substantially closed under city traffic conditions, for example at vehicle speeds of 50 to 80 km. per hour.

The closed throttle valve causes the exhaust gases to enter the after-burner for the decontamination of the gases.

There are many possible methods of controlling the throttle valve. A particularly suitable method is effected by control or regulating devices known per se independent of the power and/or speed of the vehicle or engine.

A simple method of control is effected by so designing the inlet openings lying in the direction of flow that as the velocity of gas flow increases the dynamic pressure on the throttle valve increases.

If the dynamic pressure of the exhaust gases is used as a regulator then in the upper load range, that is when dynamic pressure becomes greater as the engine power increases, the throttle valve opens either completely or partially and the exhaust gases reach the open air without additional flow resistance. A loss of power is thereby prevented at higher engine outputs.

Heaters can be located in the ante-chamber of the after-burner.

With this arrangement, the following alternative combinations for the after-burner are possible:

a. only one heater is present, for example, an electrical heater;

b. the heater is combined with a connecting afterburner, which after-burner may operate with or without catalytic mass;

c. only the after-burner alone is present, the ante chamber merely serving to guide the exhaust gas to the after-burner, and, if desired, there may be no ante-chamber, in which circumstance the exhaust gases can be guided directly into the after burner.

If electric heaters, such as electric coils are used for after-burning, then it is essential that the switching on of the heaters be initiated by the engine ignition and the switching off initiated by the glow temperature attained in the after burner.

With this arrangement, substantial decontamination of the exhaust gases is effected under cold start conditions, and when the self heating heater becomes effective as an after-burner the current supply is switched off.

To avoid rapid and repeated switching on and off independently of the heater temperature, a heater of great heat capacity is located in the after-burner in the direction of flow.

These additional heaters keep the temperature in the after-burner at approximately the same level so that the switch means can be simplified, and discharge of the vehicle battery take place.

Different embodiments known per se of the afterburner itself can be used. In a preferred embodiment the after-burner is filled with a catalytically effective mass.

It is most desirable for the inlet and outlet openings of the after-burner to be arranged so that the exhaust gases travel through the greatest path in the afterburner. By these means it is desired to achieve the most effective use of the catalytic mass in a relatively small after-burner. It is preferred for the effective catalytic mass, to be formed, for example, of anodized steel wool and steel shavings disposed in the after-burner chamber.

To increase the efficiency of the after-burner water or water vapor can be added to the exhaust gases entering the after-burner.

It is also necessary to supply additional combustion air to the after-burner to achieve combustion of unburnt constituents in the exhaust gases when the engine is idling.

In the last mentioned embodiment, fuel mixture improving devices known per se can be provided in the carburetor induction passage to add at least 2 percent of oxygen in the city traffic load range.

The supplying of additional air directly to the afterburner is therefore deliberately relinquished here in order to keep the after-burner spatially small and to avoid complicated control devices in the exhaust gas system. The mixture improving devices in the suction channel are constructed to supply excess oxygen in the city traffic region and in the California or European test region. After leaving this region which as a rule is dependent on the engine output, in order not to influence unfavorably the flame velocity then driving is normally in the full load region, that is, not with an increased portion of oxygen.

As general guiding rules of construction in order to keep the after-burner small it is still essential for the inlet and outlet openings of the after-burner to be perpendicular to the general direction of flow of the exhaust gases.

Details of the invention are shown in the drawing and still further features of the invention follow from the drawing and the description.

Figure 1:
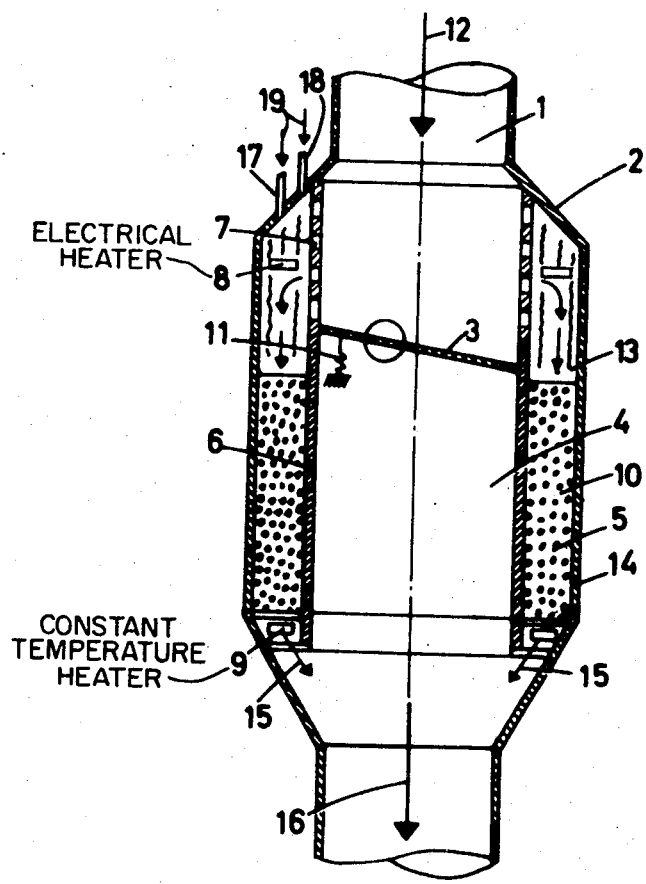
FIG. 1 is a sectional view illustrating the present invention.
Figure 2:
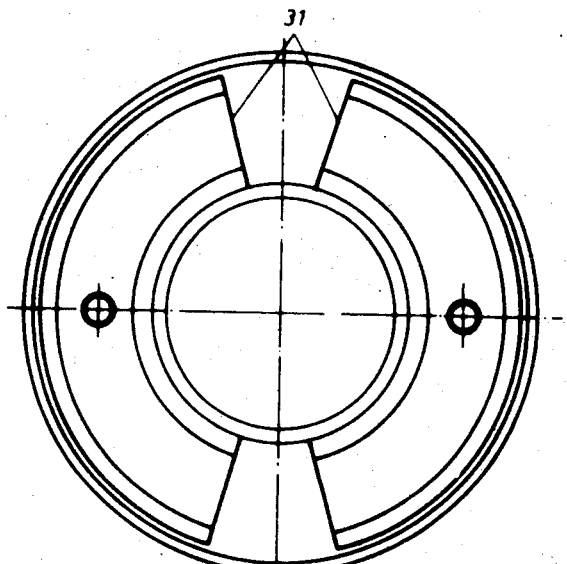
FIG. 2 is an end view illustrating a modification.

In FIG. 1 the exhaust pipe 1 the exhaust gas comes out of the cylinders and enters the after-burner 2. In this there is an eccentrically mounted throttle valve 3. The after-burner or after combuster is divided into two chambers in the embodiment shown. One is the central gas flow chamber 4, the other the actual after combustion chamber 5. Both chambers are separated by the tube wall 6 which has inlet openings 7 for the exhaust gases above the throttle valve 3. In the embodiment shown there are heaters 8 present in the upper part of the after combustion chamber 5. In the lower part, that is, in the connection to the after combustion chamber 5, heaters 9 of greater heat capacity can be arranged or there may be provided a material only with higher heat capacity in order to insure an approximately constant temperature in the after combustion chamber 5 during the operation.

In the embodiment illustrated, the after combustion chamber 5 is filled with a catalytic material 10. A low-priced catalyst is anodized steel wool or steel shaving which is anodized by superheated water vapor at more 500° C.

As already stated, the test for the decontamination of exhaust gas is carried out according to the conditions of the California or European cycle with the engine started from cold. In previously known systems, it has been shown that catalysts only respond at the end of the test because of the low temperatures in the earlier stages.

In order to attain the improvement of the decontamination of the exhaust in particular from cold starting, means are necessary which are additionally and economically provided by the present invention. The decontamination of exhaust gas should take place mainly in the city traffic region. This is from zero up to about 50 km. per hour with extension of the range up to about 80 km. per hour. It is therefore necessary to construct the system so that it is especially effective in the lower region. At higher speeds, firstly, less poison gases emerge, and, secondly, the vehicle is then outside the cities or districts where the decontamination of exhaust gas is prescribed.

The eccentrically mounted throttle valve 3 is held in place by the closing spring 11 in its closed position as shown. The spring 11 is so adjusted that it yields to the dynamic pressure which acts on the longer part of the throttle valve when the gas flow corresponds to a vehicle speed of more than 50 km. per hour, for example. It opens completely when the gas passage has reached a speed of, for example, 80 km. per hour or more. The holes 7 in the pipe wall 6 are so dimensioned that they allow the gas current through, for example, up to 50 km. per hour without substantial resistance, but above this speed the resistance to flow mounts and increased pressure is applied against the throttle valve 3. Thus, the exhaust gases in the desired region, for example, up to 50 km. per hour must pass completely through the chamber of the after-burner. Between 50 to 80 km. per hour this only partially takes place and furthermore in consequence of the increased dynamic pressure on the throttle valve 3 the valve opens completely and the exhaust gas current passes completely or almost completely through the gas flow chamber 4 in the direction of the arrow 12 which is the direction of the flow. The heaters 8 are accommodated in the ante-chamber 13 which is connected in series with the after-burner 5 in the inner pipe wall 6. The after-burner and antechamber are surrounded by a common casing 14, which gives the device a normal external shape, but any other shape can be used if desired.

The exhaust gases leave the after-burner in the direction of the arrow 15 and flow in the direction of arrows 16 into the open air or into the exhaust pipe. Water or water vapor can be added in the direction of the arrow 19 through the pipe connections 17,18. This supply may, of course, take place at other places insofar as that is suitable. The heater or the electric coil 8 is preferably heated electrically upon switching the ignition on and is switched off when the after-burning temperature is reached which produces automatic glowing of the heater or the subsequently connected catalyst produces the corresponding temperature.

Another just as essential construction of the invention is likewise to be used in engines which are provided with a fuel mixture improving device, effecting the mixture before it is supplied to the engine so that in the uniform driving stage up to about 100 km. per hour the portions of CO in the exhaust gas amounts to not more than 0.8 percent, and the CH portions to not more than 100 p.p.m.

Engines with such devices have about 2.5-4 percent oxygen in the exhaust gas.

If the supply of fuel is blocked then the values in the California and European cycle are about 0.4-0.8 percent CO and 100-200 p.p.m. CH.

The object of the other construction according to the present invention consists in fulfilling the following objects:

1. Small constructional size for the after-burner.
2. After burning of the poisonous constituent parts in the exhaust gas from idling to almost full load.
3. The after-burner to be effective immediately after a cold start.
4. Simple and safe construction.

All these advantages together attained by this construction of the invention are in contrast to outwardly similar ones.

Figure 3:
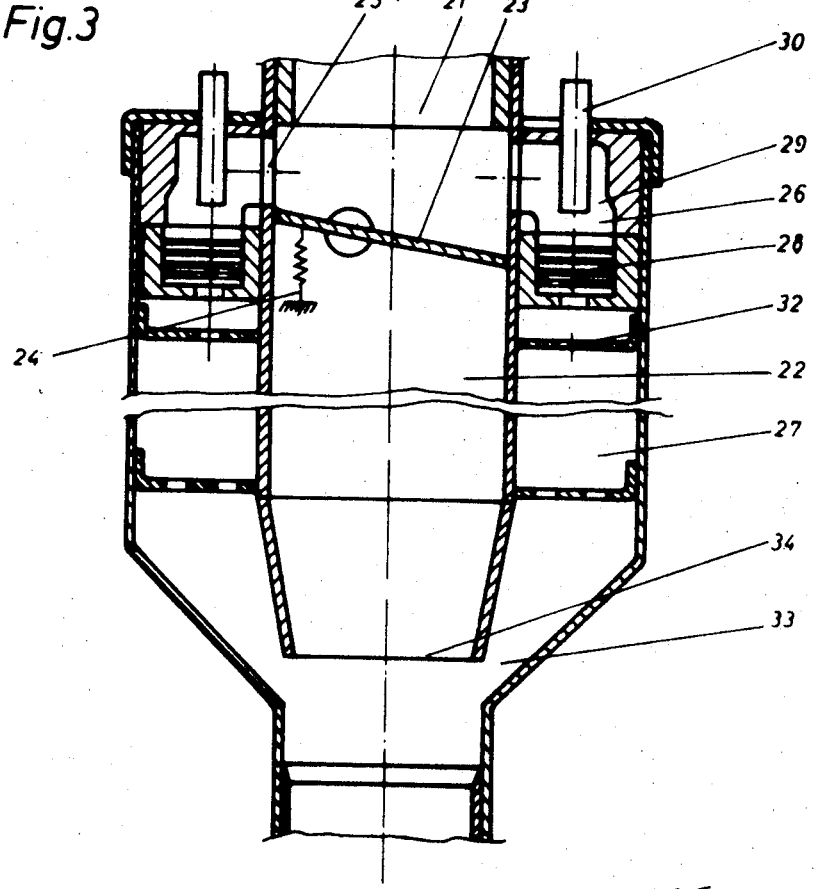
FIG. 3 is a fragmentary sectional view of the modification illustrating certain constructional details of the present invention.

In FIG. 3 at the inlet 21 the exhaust gases flow into the middle part and the channel 22 of the after-burner. In this part there is an eccentrically mounted throttle valve 23. It is held in the closed position outside the after-burner by a spring 24. One or more openings 25 are located in the flow direction before the throttle valve 23 and connects the inner chamber and the channel 22 to the outer chamber and the chamber 26. Connected after this is a further outer space and the chamber 27. In the chamber 26 a material 28 is located which burns CO and CH at low temperature. It may be, for example, osmium, zirconium, silvered iridium or similarly acting materials. Instead of these materials a heater may also be inserted in the chamber 26.

The openings 25 are of such a diameter that they do not allow more than about 20-25 percent of the exhaust gas to pass through at full load. The total passage of the exhaust gases via the outer after combustion chambers 26 and 27 is controlled from idle running up to about 60 or 80 km. per hour.

The spring 24 holds the throttle valve 23 in the closed position until the exhaust gas pressure rises above a certain amount. Because of the eccentric mounting of the valve 23 this opens when the engine comes into the output range which corresponds to 60-80 km. per hour or over.

Accordingly, only a maximum of about 15-25 percent of the exhaust gas referred to the full load passes through the chambers 26 and 27 depending on the adjustment of the spring and size of the openings 25.

The 3-4 percent portion of oxygen in the exhaust gas, which oxygen is provided by a corresponding improvement of the mixture supply to the engine, suffices to attain catalytic or thermal combustion without additional air in the after-burner. However, in order that the decontamination may be still more certain and more complete it is an advantage to introduce a small quantity of additional air.

In contradistinction to known proposals, with the present invention the combustion air is not fed to the whole exhaust gas but only to the exhaust gas which enters the after burning chambers 26 and 27. In a suction channel 29 which is enlarged in the direction of flow of the air pipe 30 is so arranged that combustion air is drawn in by the flow suction effect. The quantity of combustion air needs to be greater than the quantity of combustion air of the idle running mixture or even only half thereof as not more than 0.4-0.8 percent is contained in the exhaust. It is however important for the additional air to be guided directly into the current of the exhaust gases which is led into the after burning chambers.

For reasons of space these exhaust gases are led into a chamber disposed crosswise to the direction of flow which chamber is provided with the materials 28 or a heater. There they are guided along a certain length of path so that the materials 28 or the heater can become effective and then emerge at the location 32 in order to enter the chamber 27 via the openings 32 distributed in the whole periphery. This chamber contains catalytic material which withstands high temperatures. As there is no catalytic material which at 100° C. initiates a combustion and withstands 1,000° C. the division into two chambers is necessary.

According to the regulations for exhaust gas tests in Europe, the U.S.A. and other countries, the engine is started cold and before it is really warm the test is terminated. A material must, therefore, be used which initiates combustion at about 100° C. or below, or a suitable heater must be used.

For the total after burning higher temperatures are necessary. Therefore, the arrangement of a second chamber after the first which contains the catalytic material which is effective at about 250°-300° C. and withstands temperatures up to 1,000° C. or more. This chamber may, of course, also be formed as a heat reactor.

Thus, it will only be possible commencing with cold starting and also with hot driving or exhaust temperatures to attain a total after burning of the poison gases CO and CH.

Very many devices proceed from the fact of fulfilling the regulations which prescribe a decontamination of exhaust gas up to 50 or 80 km. per hour. The exhaust gases should, however, be decontaminated in almost the whole range. That is also part of the process of the present invention.

If as is known the whole of the exhaust gases are led through the after-burner, then this will be large and expensive. In addition, flow resistances result which reduce the output of the engine. Added to this, is thermal back accumulation which can lead to the destruction of the outlet valve. The present invention does not have these drawbacks, and, in fact, due to the following measures:

The outlet 34 from the channel 22 is so dimensioned in its full diameter that always a portion of the exhaust gases, also at full load, goes via the chambers 26 and 27. There they are after-burned and rise in temperature. These very hot gases with a portion of oxygen are fed through an outer annular slot 33 into the main current of the exhaust gases so that thorough and satisfactory mixing takes place around the whole periphery which results in after burning in the main current. Tests have shown that up to just below full load there is 0% CO and 0 p.p.m. CH in the exhaust gas. Nevertheless, only about 20 percent thereof passed through after combustion chamber.

Thus, with an after-burner catalyst bed which is about 80 percent smaller than the gas current would be expected to require at all load, decontamination of the whole gas current up to almost full load is achieved. With a suitable further supply of combustion air to the after burned at full load it is possible to decontaminate this load region substantially completely.

Added to this is a price reduction of more than 50 percent. As the field of use of the invention all possibilities are to be specified in order to decontaminate exhaust gases in a region which may be selected independently. Thereby it is possible to decontaminate only the exhaust gases in the upper load region and not in the lower region. By the control of a guide member therefore certain load regions can be selected in which one can act on the exhaust gases in one direction or another. Of course, instead of the decontamination of exhaust gas one could add also any constituents to the exhaust gases no longer to enter directly into the atmosphere but are guided selectively by devices which influence the constituents of the exhaust gases.

What is claimed is:

1. An afterburner for the treatment of exhaust gases of a combustion engine having an exhaust pipe, characterized in that an interior main pipe (6) of the afterburner is a continuation of the exhaust pipe of the combustion engine, an exterior pipe (14) enclosing said interior pipe (6) so that an annular chamber is formed around the interior pipe, said chamber having an exit, catalytic material (5) provided in at least one part of the annular chamber, an eccentrically mounted, spring-loaded throttle valve (3,11) is provided in the main pipe (6), there being openings (7) arranged in the main pipe upstream of the throttle valve which divert part of the exhaust gases, dependent on the flow pressure of the exhaust gases and so dependent on the angle of the throttle valve (3) into the annular chamber, said outside pipe (14) decreasing conically at the exit of the annular chamber and forming a ring slot in the area of which both flows are mixed homogeneously with one another.

2. Apparatus for treating exhaust gases from a mixture compressing combustion engine that includes an exhaust pipe and with applied ignition and a catalytic afterburner comprising a coaxial annular chamber surrounding the exhaust pipe, said chamber including inlet and exit ends, at least a portion of said chamber being substantially filled with catalytic material therein for the passage of exhaust gas during idling and partial load, an eccentrically mounted throttle valve mounted in the exhaust pipe at a position intermediate the ends of said annular chamber, inlet openings for the exhaust gases to pass ahead of the throttle from the exhaust pipe into said annular chamber, said annular chamber being longitudinally divided into a heater chamber adjacent said inlet openings and an after-combustion chamber adjacent a discharge conduit therefrom connecting to the exhaust pipe through a conically narrowing outer pipe at the exit end of the annular chamber provided as a suction nozzle, a plurality of heater bodies positioned within said heater chamber comprising electrically heated glow coils, and a series of heaters of high heat capacity providing essentially constant temperature values within said after-combustion chamber, said throttle valve being maintained closed by an adjustment spring so that the throttle valve opens due to dynamic pressure at excessive speed.

3. The apparatus as defined in claim 2, wherein the throttle valve is closed up to a speed of about 50–80 km. per hour.

4. The apparatus as defined in claim 2, wherein the inlet openings in the direction of flow upstream of the throttle valve are so constructed that at higher flow velocities the dynamic pressure on the throttle valve is increased.

5. The apparatus as defined in claim 2, wherein the exhaust gases encounter circuitous flow paths in the afterburner.

6. The apparatus as defined in claim 2, including means to add water, water vapor or steam to the exhaust gas for the afterburner chamber.

7. The apparatus as defined in claim 2, wherein an outlet of the exhaust pipe adjacent said exit end is of such dimensions that even at full load and with the choke valve wide open, a portion of the exhaust gas flows via the after burner chamber.

8. The apparatus as defined in claim 2, wherein at a tapering end of the exhaust pipe the partial flow led over the catalytic material is intimately mixed with the main flow via an annular slit in the same direction of flow thereof.

* * * * *